(12) United States Patent
Takeda et al.

(10) Patent No.: US 10,938,505 B2
(45) Date of Patent: Mar. 2, 2021

(54) USER TERMINAL, RADIO BASE STATION, AND RADIO COMMUNICATION METHOD

(71) Applicant: NTT DOCOMO, INC., Tokyo (JP)

(72) Inventors: Kazuaki Takeda, Tokyo (JP); Satoshi Nagata, Tokyo (JP); Kohei Kiyoshima, Tokyo (JP); Hideaki Takahashi, Tokyo (JP); Sadayuki Abeta, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/751,528

(22) PCT Filed: Aug. 8, 2016

(86) PCT No.: PCT/JP2016/073364
§ 371 (c)(1),
(2) Date: Feb. 9, 2018

(87) PCT Pub. No.: WO2017/026466
PCT Pub. Date: Feb. 16, 2017

(65) Prior Publication Data
US 2018/0241500 A1    Aug. 23, 2018

(30) Foreign Application Priority Data

Aug. 11, 2015  (JP) .................................. 2015-159243

(51) Int. Cl.
*H04L 1/00* (2006.01)
*H04W 16/28* (2009.01)
(Continued)

(52) U.S. Cl.
CPC .......... *H04L 1/0007* (2013.01); *H04L 1/0003* (2013.01); *H04L 1/0009* (2013.01);
(Continued)

(58) Field of Classification Search
CPC ............... H04W 74/006; H04W 72/14; H04W 72/0446; H04W 16/14
(Continued)

(56) References Cited

U.S. PATENT DOCUMENTS

| | | | | |
|---|---|---|---|---|
| 2014/0313985 A1* | 10/2014 | Nimbalker | ............ | H04L 1/0061 370/329 |
| 2015/0215913 A1* | 7/2015 | Cheng | ................. | H04W 72/042 370/330 |

(Continued)

FOREIGN PATENT DOCUMENTS

WO    2015-100950 A1    7/2015

OTHER PUBLICATIONS

International Search Report issued in PCT/JP2016/073364 dated Oct. 25, 2016 (1 page).
(Continued)

*Primary Examiner* — Jae Y Lee
*Assistant Examiner* — Jean F Voltaire
(74) *Attorney, Agent, or Firm* — Osha Bergman Watanabe & Burton LLP

(57) ABSTRACT

A user terminal includes a receiver that receives a downlink shared channel and a processor that obtains a transport block size (TBS) used for the downlink shared channel based on: a TBS index value that is associated with a modulation and coding scheme (MCS) index value used for the downlink shared channel; and a number of resource blocks (RBs) that are allocated to the downlink shared channel. When the downlink shared channel is transmitted by a predetermined transmission scheme and the MCS index value is a predetermined value, the processor modifies the TBS index value associated with the predetermined value and obtains the TBS based on the modified TBS index value and the number of RBs.

8 Claims, 16 Drawing Sheets

(51) Int. Cl.
*H04W 28/18* (2009.01)
*H04L 5/00* (2006.01)
*H04W 72/04* (2009.01)

(52) U.S. Cl.
CPC .......... *H04L 5/0053* (2013.01); *H04L 5/0094* (2013.01); *H04W 16/28* (2013.01); *H04W 28/18* (2013.01); *H04W 72/042* (2013.01)

(58) Field of Classification Search
USPC ........................................................ 370/252
See application file for complete search history.

(56) References Cited

U.S. PATENT DOCUMENTS

2016/0337150 A1* 11/2016 Larsson ................ H04L 1/0026
2017/0223686 A1 8/2017 You et al.
2018/0070265 A1* 3/2018 Seo ...................... H04L 1/1812

OTHER PUBLICATIONS

Written Opinion of the International Searching Authority issued in PCT/JP2016/073364 dated Oct. 25, 2016 (3 pages).
Huawei et al.; "Introduction of new maximum TBS for TM9/10"; 3GPP TSG-RAN WG1 Meeting #83, R1-157527; Anaheim, USA; Nov. 15-22, 2015 (11 pages).
3GPP TS 36.300 V8.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2008 (126 pages).
Extended European Search Report issued in counterpart European Patent Application No. 16835163.3, dated Jul. 26, 2018 (7 Pages).

* cited by examiner

| CQI INDEX | MODULATION | CODE RATE x 1024 | EFFICIENCY |
|---|---|---|---|
| 0 | OUT OF RANGE | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 2

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | reserved |
| 31 | 6 | reserved |

FIG. 3

| $I_{TBS}$ | 1 | 2 | 3 | 4 | 5 | 6 | 7 | 8 | 9 | 10 |
|---|---|---|---|---|---|---|---|---|---|---|
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

FIG. 4

| TRANSMISSION SCHEME | SUBFRAME TYPE | MCS INDEX | CODE RATE |
|---|---|---|---|
| 2 × 2 MIMO TM3/4 | DL subframe | 28 | 0.876 |
| | SP subframe | 28 | 1.213 |
| 4 × 4 MIMO TM9 | DL subframe | 28 | 1.044 |
| | SP subframe | 28 | 1.440 |
| 4 × 4 MIMO TM3/4 | DL subframe | 28 | 0.922 |
| | SP subframe | 28 | 1.280 |

FIG. 5

| $I_{TBS}$ | $N_{PRB}$ | | | | | | | | | |
|---|---|---|---|---|---|---|---|---|---|---|
| | 91 | 92 | 93 | 94 | 95 | 96 | 97 | 98 | 99 | 100 |
| 25 | 57336 | 59256 | 59256 | 59256 | 61664 | 61664 | 61664 | 61664 | 63776 | 63776 |
| 26 | 66592 | 68808 | 68808 | 68808 | 71112 | 71112 | 71112 | 73712 | 73712 | 75376 |

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| ⋮ | | |
| 27 | 6 | 25 |
| 28 | 6 | 26 |
| 29 | 2 | reserved |
| 30 | 4 | |
| 31 | 6 | |

FIG.7B

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| ⋮ | | |
| 27 | 6 | 25 |
| 28 | 6 | 26A |
| 29 | 2 | reserved |
| 30 | 4 | |
| 31 | 6 | |

| $I_{TBS}$ | 91 | 92 | 93 | 94 | 95 | 96 | 97 | 98 | 99 | 100 |
|---|---|---|---|---|---|---|---|---|---|---|
| 26A | ... | ... | ... | ... | ... | ... | ... | ... | ... | 71112 |

$N_{PRB}$

FIG. 8

```
┌─────────────────────────────────────────────────────────────────────────────┐
│ -                    PDSCH-Config                                           │
│                                                                             │
│ The IE PDSCH-ConfigCommon and the IE PDSCH-ConfigDedicated are used to       │
│ specify the common and the UE specific PDSCH configuration respectively.    │
│                                                                             │
│                     PDSCH-Config information element                        │
│                                                                             │
│ -- ASN1START                                                                │
│                                                                             │
│ PDSCH-ConfigCommon ::=              SEQUENCE {                              │
│    referenceSignalPower                  INTEGER (-60..50),                 │
│    p-b                              INTEGER (0..3)                          │
│ }                                                                           │
│                                                                             │
│ PDSCH-ConfigDedicated::=            SEQUENCE {                              │
│    p-a                              ENUMERATED {                            │
│                                         dB-6, dB-4dot77, dB-3, dB-1dot77,   │
│                                         dB0, dB1, dB2, dB3}                 │
│ }                                                                           │
│                                                                             │
│ PDSCH-ConfigDedicated-v10xy ::=     SEQUENCE {                              │
│    altTBS-r10                       BOOLEAN    OPTIONAL-- Need OP           │
│ }                                                                           │
│                                                                             │
│ PDSCH-ConfigDedicated-v1130 ::=     SEQUENCE {                              │
│    dmrs-ConfigPDSCH-r11             DMRS-Config-r11    OPTIONAL, -- Need ON │
│    qcl-Operation                    ENUMERATED{typeA, typeB} OPTIONAL,--Need OR │
│    re-MappingQCLConfigToReleaseList-r11    RE-MappingQCLConfigToReleaseList-│
│ r11    OPTIONAL,      -- Need ON                                            │
│       re-MappingQCLConfigToAddModList-r11  RE-MappingQCLConfigToAddModList- │
│ r11          OPTIONAL      -- Need ON                                       │
│ }                                                                           │
│                                                                             │
│ RE-MappingQCLConfigToAddModList-r11 ::=  SEQUENCE (SIZE (1..maxRE-MapQCL-   │
│ r11)) OF PDSCH-RE-MappingQCL-Config-r11                                     │
│                                                                             │
│ RE-MappingQCLConfigToReleaseList-r11 ::= SEQUENCE (SIZE (1..maxRE-MapQCL-   │
│ r11)) OF PDSCH-RE-MappingQCL-ConfigId-r11                                   │
│ ...                                                                         │
└─────────────────────────────────────────────────────────────────────────────┘
```

| PDSCH-Config field descriptions |
|---|
| altTBS |
| Indicates the applicability of the alternative TBS for $I_{TBS}$ = 26 and $N_{PRB}$ = 100 as specified in TS 36.213 [23]. E-UTRAN sets the value to TRUE only if *transmissionMode* is set to *tm9* or *tm10*. If this field is not present, the UE shall use the TBS as specified in table 7.1.7.2.1-1 in TS 36.213 [23]. |

FIG. 14

| – PDSCH-Config |
|---|
| The IE *PDSCH-ConfigCommon* and the IE *PDSCH-ConfigDedicated* are used to specify the common and the UE specific PDSCH configuration respectively. |
| ***PDSCH-Config* information element** |
| ```
-- ASN1START PDSCH-ConfigCommon ::=            SEQUENCE {
    referenceSignalPower              INTEGER (-60..50),
    p-b                           INTEGER (0..3)
}

PDSCH-ConfigDedicated::=          SEQUENCE {
    p-a                           ENUMERATED {
                                      dB-6, dB-4dot77, dB-3, dB-1dot77,
                                      dB0, dB1, dB2, dB3}
}

PDSCH-ConfigDedicated-v10xy ::=   SEQUENCE {
    altMod-TBS-Table-r10          BOOLEAN                 OPTIONAL  -- Need OP
}

PDSCH-ConfigDedicated-v1130 ::=           SEQUENCE {
    dmrs-ConfigPDSCH-r11          DMRS-Config-r11      OPTIONAL,  -- Need ON
    qcl-Operation                 ENUMERATED{typeA, typeB} OPTIONAL,--Need OR
    re-MappingQCLConfigToReleaseList-r11    RE-MappingQCLConfigToReleaseList-
r11     OPTIONAL,       -- Need ON
      re-MappingQCLConfigToAddModList-r11   RE-MappingQCLConfigToAddModList-
r11           OPTIONAL      -- Need ON
}

RE-MappingQCLConfigToAddModList-r11 ::=   SEQUENCE (SIZE (1..maxRE-MapQCL-
r11)) OF PDSCH-RE-MappingQCL-Config-r11

RE-MappingQCLConfigToReleaseList-r11 ::=  SEQUENCE (SIZE (1..maxRE-MapQCL-
r11)) OF PDSCH-RE-MappingQCL-ConfigId-r11
...
``` |

| ***PDSCH-Config* field descriptions** |
|---|
| altMod-TBS-Table |
| Indicates the applicability of the alternative Modulation and TBS index table for PDSCH (i.e., Table 7.1.7.1-2 in TS 36.213 [23]. E-UTRAN sets the value to TRUE only if transmissionMode is set to tm9 or tm10. If this field is not present, the UE shall use Table 7.1.7.1-1 in TS 36.213 [23]. |

FIG. 15

```
-                    PDSCH-Config
The IE PDSCH-ConfigCommon and the IE PDSCH-ConfigDedicated are used to specify the common and the UE
specific PDSCH configuration respectively.

PDSCH-Config information element

-- ASN1START

PDSCH-ConfigCommon ::=              SEQUENCE {
    referenceSignalPower                INTEGER (-60..50),
    p-b                             INTEGER (0..3)
}

PDSCH-ConfigDedicated::=            SEQUENCE {
    p-a                             ENUMERATED {
                                        dB-6, dB-4dot77, dB-3, dB-1dot77,
                                        dB0, dB1, dB2, dB3}

}

PDSCH-ConfigDedicated-v10xy ::=     SEQUENCE {
    nPRB-Coeff-r10                  INTEGER (80..95)          OPTIONAL  -- Need OR
}

PDSCH-ConfigDedicated-v1130 ::=         SEQUENCE {
    dmrs-ConfigPDSCH-r11            DMRS-Config-r11     OPTIONAL,  -- Need ON
    qcl-Operation                   ENUMERATED{typeA, typeB} OPTIONAL,--Need OR
    re-MappingQCLConfigToReleaseList-r11      RE-MappingQCLConfigToReleaseList-
r11     OPTIONAL,       -- Need ON
        re-MappingQCLConfigToAddModList-r11   RE-MappingQCLConfigToAddModList-
r11           OPTIONAL       -- Need ON
}

RE-MappingQCLConfigToAddModList-r11 ::=    SEQUENCE (SIZE (1..maxRE-MapQCL-
r11)) OF PDSCH-RE-MappingQCL-Config-r11

RE-MappingQCLConfigToReleaseList-r11 ::=  SEQUENCE (SIZE (1..maxRE-MapQCL-
r11)) OF PDSCH-RE-MappingQCL-ConfigId-r11
...
```

| PDSCH-Config field descriptions |
|---|
| nPRB-Coeff |
| Specifies the coefficient used for deriving $N_{PRB}$ to determine TBS as specified in TS 36.213 [23. 7.1.7]. The actual value is IE value * 0.01. E-UTRAN includes this field only if transmissionMode is set to tm9 or tm10 and MBSFN subframes are not configured on any subframes. |

USER TERMINAL, RADIO BASE STATION, AND RADIO COMMUNICATION METHOD

CROSS REFERENCE TO RELATED APPLICATIONS

The present application is a national phase application of PCT/JP2016/073364, filed on Aug. 8, 2016, which claims priority to Japanese Patent Application No. 2015-159243, filed on Aug. 11, 2015. The contents of these applications are hereby incorporated by reference in their entirety.

TECHNICAL FIELD

One or more embodiments disclosed herein relate to a user terminal, a radio communication system, and a radio communication method of a next-generation communication system.

BACKGROUND

In UMTS (Universal Mobile Telecommunications System) networks, for purposes of higher data rates, lower delay and the like, Long Term Evolution (LTE) has been specified (Non-Patent Document 1). Further, for purposes of wider bands and a higher speed than LTE, a successor system of LTE (also referred to as, for example, LTE-A (LTE-Advanced), FRA (Future Radio Access), 4G and 5G) has also been studied.

According to an existing system such as LTE, Adaptive Modulation and Coding (AMC) for adaptively adjusting at least one of a modulation scheme and a code rate is performed as link adaptation. More specifically, according to the AMC, at least one of a modulation scheme and a code rate of a downlink shared channel (PDSCH: Physical Downlink Shared Channel) is adaptively controlled based on a Channel Quality Indicator (CQI) fed back from a user terminal.

CITATION LIST

Non-Patent Literature

[Non-Patent Literature 1] 3GPP TS 36.300 Rel. 8 "Evolved Universal Terrestrial Radio Access (E-UTRA) and Evolved Universal Terrestrial Radio Access Network (E-UTRAN); Overall description; Stage 2"

SUMMARY

Embodiments disclosed herein include a user terminal comprising: a receiver that receives a downlink shared channel; and a processor that obtains a transport block size (TBS) used for the downlink shared channel based on: a TBS index value that is associated with a modulation and coding scheme (MCS) index value used for the downlink shared channel; and a number of resource blocks (RBs) that are allocated to the downlink shared channel, wherein, when the downlink shared channel is transmitted by a predetermined transmission scheme and the MCS index value is a predetermined value, the processor modifies the TBS index value associated with the predetermined value and obtains the TBS based on the modified TBS index value and the number of RBs.

In one aspect, when the receiver receives higher layer control information including instruction information indicating applying the modified TBS index value, the processor obtains the TBS based on the modified TBS index value and the number of RBs.

In one aspect, the processor obtains the TBS from a table that defines a TBS associated with each number of RBs in a case of the modified TBS index value.

In one aspect, the TBS associated with at least one number of RBs in the modified TBS index value is smaller than the TBS associated with the one number of RBs in the TBS index value before being modified.

In one aspect, the predetermined transmission scheme is either transmission mode 9 or transmission mode 10.

In one aspect, the predetermined value is 28, and the modified TBS index value is 26A.

Embodiments disclosed herein further include a radio base station comprising: a transmitter that receives a downlink shared channel; and a processor that controls a transport block size (TBS) used for the downlink shared channel, wherein the TBS is obtained in a user terminal based on: a TBS index value that is associated with a modulation and coding scheme (MCS) index value used for the downlink shared channel; and a number of resource blocks (RBs) that are allocated to the downlink shared channel, and wherein when the downlink shared channel is transmitted by a predetermined transmission scheme and the MCS index value is a predetermined value, the TBS index value associated with the predetermined value is modified and the TBS is obtained based on the modified TBS index value and the number of RBs by the user terminal.

Embodiments disclosed herein further include a radio communication method for a user terminal, comprising: receiving a downlink shared channel; and obtaining a transport block size (TBS) used for the downlink shared channel based on: a TBS index value that is associated with a modulation and coding scheme (MCS) index value used for the downlink shared channel; and a number of resource blocks (RB) that are allocated to the downlink shared channel, wherein, the obtaining further comprises, when the downlink shared channel is transmitted by a predetermined transmission scheme and the MCS index value is a predetermined value, modifying the TBS index value associated with the predetermined value and obtaining the TBS based on the modified TBS index value and the number of RBs.

BRIEF DESCRIPTION OF DRAWINGS

FIG. 2 is a diagram illustrating an example of a CQI table;

FIG. 3 is a diagram illustrating an example of a MCS table;

FIG. 4 is a diagram illustrating an example of a TBS table;

FIG. 5 is a diagram illustrating a correspondence between transmission schemes and code rates;

FIG. 6 is a diagram illustrating an example of the TBS table according to one or more embodiments of the present invention;

FIGS. 7A and 7B are diagrams illustrating examples of the MCS table according to one or more embodiments of the present invention;

FIG. 8 is a diagram illustrating an example of a correction table according to one or more embodiments of the present invention;

FIG. 14 is a diagram illustrating an example of higher layer control information according to one or more embodiments of the present invention;

FIG. 15 is a diagram illustrating an example of higher layer control information according to one or more embodiments of the present invention; and FIG. 16 is a diagram illustrating an example of higher layer control information according to one or more embodiments of the present invention.

DETAILED DESCRIPTION

In the existing system, the user terminal determines a size of a transport block (Transport Block Size (TBS)) used for a downlink shared channel based on the modulation scheme adaptively controlled according to the AMC. The user terminal determines a code rate based on the determined TBS, and decodes the downlink shared channel based on the determined code rate.

However, when the Transport Block Size (TBS) of the downlink shared channel is determined based on a modulation scheme that is adaptively controlled, there is a concern that the code rate determined based on the TBS exceeds a value of one depending on the transmission scheme (e.g., the number of layers and a transmission mode of MIMO (Multiple-Input and Multiple-Output)) of the downlink shared channel. As a result, there is a concern that the user terminal cannot appropriately receive and/or decode the downlink shared channel.

In view of such aspects, one or more embodiments of the present invention provide a user terminal, a radio base station and a radio communication method that can appropriately receive and/or decode a downlink shared channel when a Transport Block Size (TBS) of a downlink shared channel is determined based on a modulation scheme that is adaptively controlled.

A user terminal according to one aspect of the present invention includes: a reception section that receives a downlink shared channel; and a control section that obtains a transport block size (TBS) used for the downlink shared channel based on a TBS index value and a number of resource blocks (RBs), where the TBS block size index value is associated with a modulation and coding scheme (MCS) index valued used for the downlink shared channel, and the RBs are allocated to the downlink shared channel, and, when the downlink shared channel is transmitted by a predetermined or a specific transmission scheme and the MCS index value is a predetermined or a specific value, the TBS index value associated with the specific value is changed and the control section obtains the TBS based on the changed TBS index value and the number of RBs. According to the present invention, a user terminal can appropriately receive and/or decode a downlink shared channel when a Transport Block Size (TBS) of the downlink shared channel is determined based on a modulation scheme that is adaptively controlled.

Figure 1:
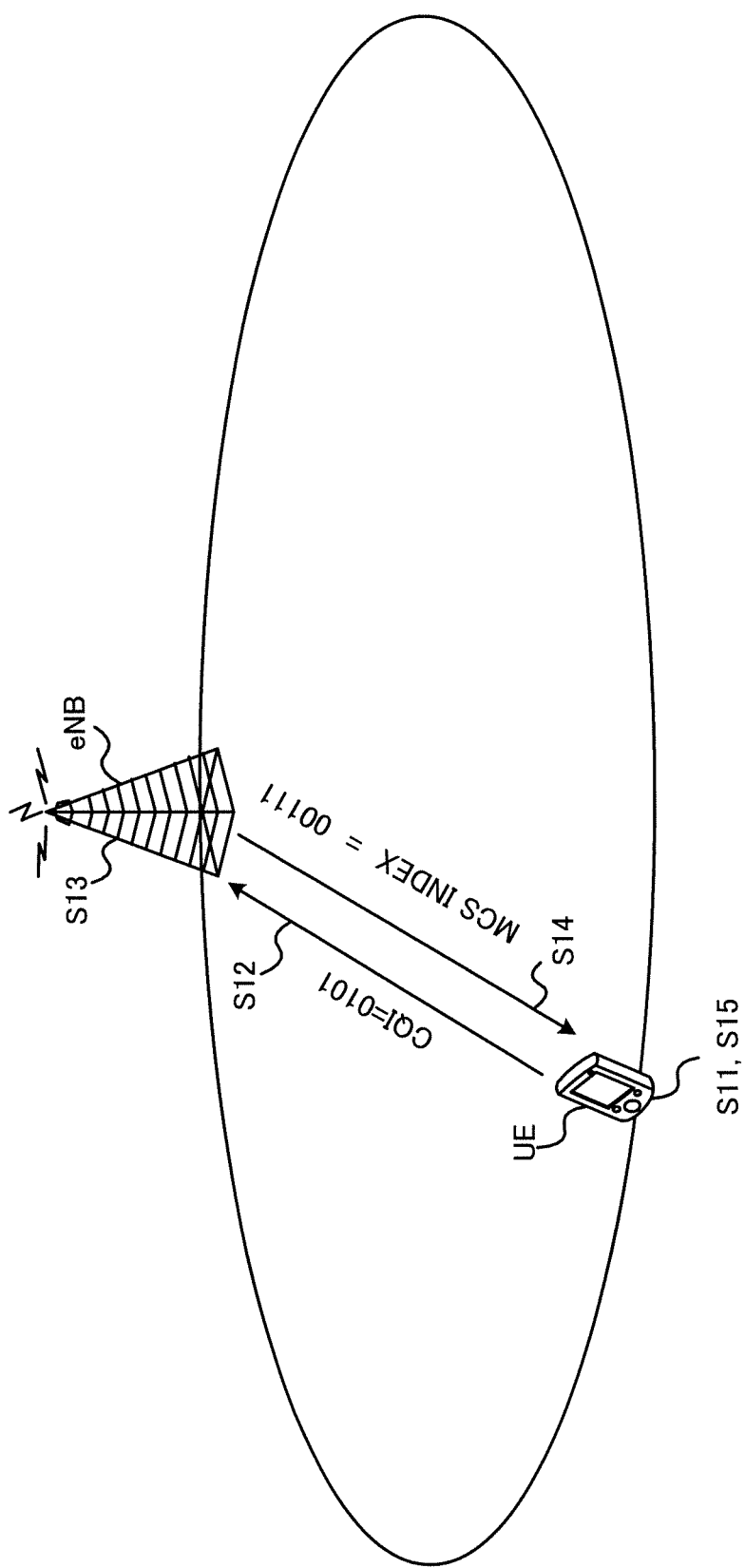
FIG. 1 is an explanatory diagram of Adaptive Modulation Coding (AMC)

Adaptive Modulation Coding (AMC) of a radio communication system will be described with reference to FIGS. 1 to 4. FIG. 1 is an explanatory diagram of AMC of the radio communication system. FIG. 2 is a diagram illustrating an example of a CQI table used for AMC. FIG. 3 is a diagram illustrating an example of a MCS (Modulation and Coding Scheme) table used for AMC. FIG. 4 is a diagram illustrating an example of a TBS table used for AMC.

In the radio communication system illustrated in FIG. 1, a user terminal (UE: User Equipment) measures channel quality based on a reference signal from a radio base station (eNB: eNodeB), and determines Channel Quality Indicator (CQI) based on the measured channel quality (step S11). More specifically, the user terminal refers to the CQI table illustrated in FIG. 2, and determines a CQI indicating a modulation scheme and a code rate that enable demodulation under measured channel quality environment. In this regard, the channel quality includes, for example, a SINR (Signal to Interference Plus Noise Ratio) and a SNR (Signal to Noise Ratio).

As illustrated in FIG. 2, Channel Quality Indicators (CQI), modulation schemes and code rates are associated in the CQI table. For example, in FIG. 2, 16 types of combinations of modulation schemes and code rates are defined according to channel quality in the user terminal. Consequently, in FIG. 2, it is possible to uniquely identify the 16 types of combinations by providing a 4-bit CQI. In this regard, a CQI value may be referred to as a CQI index in the CQI table.

The user terminal feeds back to the radio base station the CQI determined by referring to the CQI table illustrated in FIG. 2 (step S12). For example, in FIG. 1, the user terminal feeds back 4-bit bit information "0101 (=5)" as a CQI to the radio base station. In this regard, the CQI is fed back by using an uplink control channel (PUCCH: Physical Uplink Control Channel) and an uplink shared channel (PUSCH: Physical Uplink Shared Channel).

The radio base station determines at least one of the modulation scheme, the code rate and the TBS of the downlink shared channel (PDSCH) based on the CQI fed back from the user terminal (step S13). More specifically, the radio base station refers to the CQI table illustrated in FIG. 2, and obtains the modulation scheme and the code rate associated with the fed back CQI. Further, the radio base station refers to the MCS table illustrated in FIG. 3, and obtains an MCS index indicating a modulation order associated with the obtained modulation scheme and a Transport Block Size (TBS) index associated with the obtained code rate.

As illustrated in FIG. 3, MCS indices, modulation orders and TBS indices are associated in the MCS table. In FIG. 3, 32 types of combinations of the modulation orders and the TBS indices are defined. Consequently, it is possible to uniquely identify the 32 types of combinations by providing a 5-bit MCS. In this regard, the MCS index is an identifier for identifying at least one of the modulation scheme, the code rate and the TBS index (associated with the code rate). Further, the TBS index is a Transport Block Size (TBS) identifier for identifying a Transport Block Size (TBS).

For example, as illustrated in FIG. 1, when receiving a feedback of the 4-bit bit information "0101 (=5)" as a CQI from the user terminal, the radio base station refers to the CQI table illustrated in FIG. 2, and obtains "QPSK" as the modulation scheme and "449" as the code rate (×1024).

Further, the radio base station refers to the MCS table illustrated in FIG. 3, and obtains a MCS index "7" indicating a combination of a modulation order "2" associated with "QPSK", and a TBS index "7" associated with the code rate "449".

The radio base station notifies the user terminal of the determined MCS index (step S14). For example, in FIG. 1, the radio base station is notified of 5-bit bit information "00111 (=7)" as an MCS index by the user. In this regard, the MCS index is included in Downlink Control Information (DCI), and is notified by using a downlink control channel (PDCCH: Physical Downlink Control Channel), and an enhanced downlink control channel (EPDCCH: Enhanced Physical Downlink Control Channel).

The user terminal obtains a modulation scheme and a code rate of a PDSCH based on the MCS index notified by the radio base station (step S15). More specifically, the user terminal refers to the MCS table illustrated in FIG. 3, and obtains a modulation order and a TBS index associated with the fed back MCS index. The user terminal obtains a PDSCH by using the modulation scheme associated with the obtained modulation order.

Further, the user terminal refers to the TBS table illustrated in FIG. 4, and obtains a Transport Block Size (TBS) associated with the obtained TBS index and the number of Resource Blocks (RBs) allocated to the PDSCH. In this regard, the Resource Block (RB) may be a PRB (Physical Resource Block) or a PRB pair. The Resource Block (RB) will be referred to as a "PRB" below.

In this regard, the TBS table illustrated in FIG. 4 indicates respective TBSs associated with the numbers of PRBs "1" to "10", yet may define TBSs associated with the numbers of PRBs that are 11 or more (e.g. "11" to "100"). Further, the number of PRBs allocated to a PDSCH may be included in a DCI or may be determined by the user terminal based on information included in the DCI. Furthermore, the number of PRBs may be the number of PRBs per transport block of the PDSCH.

The user terminal calculates a code rate based on the obtained TBS according to, for example, equation (1). The user terminal decodes the PDSCH by using the calculated code rate.

[Mathematical 1]

$$\frac{TBS + CRC}{RE_{PDSCH} * N_{PRB} * M} = \text{target coding rate} \quad \text{(Equation 1)}$$

In this regard, the TBS is a TBS obtained from the TBS table (e.g. FIG. 4). Further, a $RE_{PDSCH}$ indicates the number of Resource Elements (RE) for the PDSCH per PRB. When, for example, the PDCCH is arranged only on a first symbol of a subframe (CFI (Channel Format Indicator)=1), and in a case of a four CRS (Cell-specific Reference Signal) ports, the $RE_{PDSCH}$ is 136. Further, a $N_{RPB}$ represents the number of PRBs allocated to the PDSCH. Furthermore, M represents a modulation order obtained from the MCS table illustrated in FIG. 3.

For example, as illustrated in FIG. 1, when notified of the MCS index "00111 (=7)" by the radio base station, the user terminal refers to the MCS table illustrated in FIG. 3, and obtains the modulation order "2" and the TBS index "7" associated with the MCS index "7". The user terminal demodulates the PDSCH by using the modulation scheme "QPSK" whose modulation order is "2".

Further, the user terminal refers to the MCS table illustrated in FIG. 4 and obtains a TBS "712" associated with the TBS index "7" and the number of PRBs ("6" herein) allocated to the PDSCH. The user terminal decodes the PDSCH based on the obtained TBS.

A TBS associated with a maximum TBS index "26" in the TBS table illustrated in FIG. 4 is configured such that a code rate does not exceed 0.93 when 136 Resource Elements (RE) per PRB can be allocated to the PDSCH (in a case of CFI=1 and four CRS ports). In this regard, the code rate is determined according to, for example, above equation (1).

Hence, there is a concern that the code rate exceeds a value of one depending on the transmission scheme of the PDSCH (e.g. the number of layers of MIMO (Multiple-Input and Multiple-Output), a transmission mode and the number of arranged reference signals). FIG. 5 is a diagram illustrating a correspondence between transmission schemes, MCS indices and code rates. In this regard, in FIG. 5, the code rate is calculated assuming 20 MHz (100 PRBs) and CFI=1. Further, a TDD (Time Division Duplex) system assumes a SP subframe configuration (Special Subframe Configuration) 7 as a SPecial (SP) subframe configured by a downlink symbol, a guard symbol and an uplink symbol.

As illustrated in FIG. 5, in a case of an MCS index "28" indicating 64 QAM (Quadrature amplitude modulation), the code rate exceeds a value of one in an SP subframe even in cases of every transmission scheme of 2×2 MIMO (Multiple-Input and Multiple-Output) (spatial multiplexing of two layers) and a transmission mode (TM) 3/4, 4×4 MIMO (spatial multiplexing of four layers) and a TM 9, and 4×4 MIMO and a TM 3/4. Further, the code rate exceeds a value of one in a DownLink (DL) subframe in a case of 4×4 MIMO and the TM 9.

Thus, when the TBS table illustrated in FIG. 4 is used, there is a concern that the code rate exceeds a value of one in a case of a specific transmission scheme (e.g. in a SP subframe and a DL subframe in a case of 4×4 MIMO and the TM 9). It is assumed to select a MCS index lower than "28" and use a lower-order modulation scheme rather than a modulation scheme defined based on a CQI to make the code rate less than a value of one even in a case of such a specific transmission scheme. However, there is a concern that spectrum use efficiency substantially decreases when a modulation scheme is changed to a lower-order modulation scheme than the modulation scheme determined based on the CQI.

Hence, the inventors of the present invention have conceived controlling a method for determining a TBS such that, when the TBS of the PDSCH (downlink shared channel) is determined based on a modulation scheme that is adaptively controlled, and even when a PDSCH is transmitted by a specific transmitting method, a code rate determined based on the TBS does not exceed a value of one, and arrived at the present invention.

According to one aspect of the present invention, the user terminal that receives the PDSCH (downlink shared channel) receives a MCS index, and obtains a TBS associated with a TBS index associated with the MCS index and the number of PRBs allocated to the PDSCH, from the TBS table that associates TBS indices, numbers of PRBs (Resource Blocks (RBs)) and TBSs. Further, when the PDSCH is transmitted by the specific transmission scheme, the user terminal obtains a TBS having a smaller value than a value of the TBS obtained from the TBS table. In this regard, a code rate calculated based on the obtained TBS (e.g. according to above equation (1)) is less than a value of one.

Further, according to one aspect of the present invention, obtaining (applying) a TBS having a smaller value than a value of a TBS obtained from the TBS table may be instructed by higher layer signaling. The user terminal may obtain a TBS having a smaller value than a value of a TBS obtained from the TBS when higher layer control information (e.g. PDSCH-Config) used to receive a PDSCH includes instruction information (e.g. altTBS or altMod-TBS-Table).

The radio communication method according to the present invention will be described below. A case where a MCS table including modulation schemes equal to or lower than 64 QAM is used is assumed below, yet a MCS table including modulation schemes equal to or lower than 256 QAM may be used. In this regard, these MCS tables may be switched by higher layer signaling.

Further, a specific transmission scheme of a PDSCH includes at least one of that a transmission mode is the transmission mode (TM) 9, that a transmission mode is the TM 9 or a TM 10, that the number of CSI-RS (Channel State Information-Reference Signal) antenna ports is four or eight, that spatial multiplexing is performed on three layers or more (e.g. 4×4 MIMO), and that subframes are not MBSFN (Multicast-Broadcast Single-Frequency Network) subframes. However, specific transmission scheme is not limited to this.

Furthermore, a specific value of the TBS index is the maximum TBS index value "26" in the MCS table (see FIG. 3) including a modulation scheme equal to or lower than 64 QAM yet is not limited to this. Still further, a specific value of the number of PRBs is a maximum number of PRBs "100" defined in the TBS table yet is not limited to this.

Moreover, according to one aspect of the present invention, "when a PDSCH is transmitted by a specific transmission scheme", a TBS that is smaller than a TBS obtained from the TBS table and takes such a value that a code rate calculated according to above equation (1) is less than a value of one is obtained. However, conditions for obtaining the TBS of the smaller value are not limited to the above. For example, the conditions may include that "a PDSCH is transmitted by a specific transmission scheme and the TBS index is a specific value", may include that "the PDSCH is transmitted by a specific transmission scheme, the TBS index is a specific value and the number of PRBs allocated to the PDSCH is a specific value" or may be other conditions.

(Aspect 1)

According to Aspect 1, when a PDSCH is transmitted by a specific transmission scheme (at least one of, for example, that a transmission mode is the TM 9, that a transmission mode is the TM 9 or the TM 10, that the number of CSI-RS antenna ports is four or eight, that spatial multiplexing is performed on three layers or more, and that subframes are not MBSFN subframes), and, when a TBS index is a specific value (e.g. "26") and the number of PRBs allocated to the PDSCH is a specific value (e.g. "100"), the user terminal obtains a TBS having a value separately configured from values of the TBS table that associates the TBS indices, the numbers of PRBs and the TBSs.

FIG. 6 is a diagram illustrating an example of the TBS table according to one or more embodiments of the present invention. In this regard, FIG. 6 illustrates only that the numbers of PRBs ($N_{RPB}$) are "91" to "100". However, even when the numbers of PRBs ($N_{RPB}$) are "1" to "90", too, TBSs are defined likewise. Further, the numbers of PRBs ($N_{RPB}$) are not limited to "1" to "100". Furthermore, FIG. 6 illustrates TBS indices "25" and "26". However, a TBS is defined per number of PRBs for other TBS indices "1" to "24" and "28" to "33", too.

In the TBS table illustrated in FIG. 6, a TBS associated with the TBS index "26" and the number of PRBs ($N_{RPB}$) "100" is "75376". When the PDSHC is transmitted by the specific transmission scheme, and when the TBS index is "26" and the number of PRBs allocated to the PDSCH is "100", the user terminal obtains a TBS that is smaller than "75376" and takes such a value that, for example, the code rate calculated according to equation (1) is less than a value of one instead of "75376" defined in the TBS table. The user terminal decodes the PDSCH by using the TBS of the value.

In this regard, the value that is smaller than "75376" may be stored (configured) to the user terminal in advance or may be notified to the user terminal by the radio base station by higher layer signaling (e.g. RRC (Radio Resource Control) signaling) or system information (SIB: System Information Block).

Further, when the PDSCH is transmitted by a specific transmission scheme, obtaining (applying) a value separately configured from the values of the TBS table (e.g. FIG. 6) as a TBS associated with a TBS index of a specific value (e.g. "26") and the number of PRBs of a specific value (e.g. "100") may be instructed by higher layer signaling.

When, for example, the PDSCH is transmitted by a specific transmission scheme, instruction information (e.g. altTBS) indicating obtaining (applying) a value separately configured from the values of the TBS table (e.g. FIG. 6) as a TBS associated with a TBS index of a specific value (e.g. "26") and the number of PRBs of a specific value (e.g. "100") may be included in higher layer configuration information (e.g. PDSCH-Config) (see, for example, FIG. 14).

When the instruction information (e.g. altTBS) is included in the higher layer control information (e.g. PDSCH-Config) and when the TBS index is a specific value (e.g. "26") and the number of PRBs allocated to the PDSCH is a specific value (e.g. "100"), the user terminal may obtain (apply) the value separately configured from the values of the TBS table. Meanwhile, when the instruction information (e.g. altTBS) is not included in the higher layer control information (e.g. PDSCH-Config), the user terminal may obtain a TBS from the TBS table.

According to Aspect 1, when the PDSCH is transmitted by the specific transmission scheme and when the TBS index is the specific value (e.g. "26") and the number of PRBs allocated to the PDSCH is the specific value (e.g. "100"), the TBS having a value separately configured from the values of the TBS table is used. Hence, even when the same modulation scheme (e.g. 64 QAM) is used for the specific transmission scheme, it is possible to make the code rate less than a value of one. As a result, the user terminal can appropriately receive and/or decode the PDSCH.

(Aspect 2)

According to Aspect 2, a PDSCH is transmitted by a specific transmission scheme (at least one of, for example, that a transmission mode is the TM 9, that a transmission mode is the TM 9 or the TM 10, that the number of CSI-RS antenna ports is four or eight, that spatial multiplexing is performed on three layers or more, and that subframes are not MBSFN subframes), and, when a TBS index is a specific value (e.g. "26"), the user terminal obtains a TBS associated with the number of PRBs allocated to the PDSCH from a correction table that associates TBS indices having values (e.g. "26A" or "34") that are not defined in the TBS table, the numbers of PRBs and TBSs.

More specifically, when the PDSCH is transmitted by the specific transmission scheme and when a MCS index is a specific value (e.g. "28"), the user terminal obtains the TBS index "26A" associated with the MCS index "28" from a new table instead of an existing MCS table. When obtaining the TBS index "26A" from the new MCS table, the user terminal obtains a TBS from the correction table.

FIGS. 7A and 7B contain explanatory diagrams of examples of the MCS table according to one or more embodiments of the present invention. FIG. 7A illustrates an example of the existing MCS table, and FIG. 7B illustrates an example of the MCS table according to one or more embodiments of the present invention. As illustrated in FIG. 7A, the MCS index "28" is associated with a modulation order "6" of 64 QAM and the TBS index "26" in the existing MCS table.

Meanwhile, as illustrated in FIG. 7B, the MCS index "28" is associated with the modulation order "6" of 64 QAM and the new TBS index "26A" in the new MCS table. In this regard, the newly defined TBS index may not be "26A" and needs to be values that are not used in the existing TBS table.

FIG. 8 is an explanatory diagram of an example of the correction table according to one or more embodiments of the present invention. In this regard, FIG. 8 illustrates only that the numbers of PRBs ($N_{RPB}$) are "91" to "100" yet when the numbers of PRBs ($N_{RPB}$) are "1" to "90", TBSs are defined likewise. Further, the numbers of PRBs ($N_{RPB}$) are not limited to "1" to "100".

In the correction table, TBSs that are associated with all numbers of PRBs ($N_{RPB}$) in a case of a TBS index of a value (e.g. "26A") that is not defined in the TBS table are defined. More specifically, a TBS associated with each number of PRB ($N_{RPB}$) in a case of the TBS index "26A" may be configured smaller than a TBS associated with each number of PRB ($N_{RPB}$) in a case of the TBS index "26".

For example, as illustrated in FIG. 8, a TBS associated with the number of PRBs ($N_{RPB}$) "100" in a case of the TBS index "26A" may be configured to the same as a TBS "71112" associated with the numbers of PRBs "95" to "100" in a case of the TBS index "26". Further, TBSs associated with the numbers of PRBs ($N_{RPB}$) "1" to "99" in a case of the TBS index "34" may be configured to values that are smaller than "71112" and make the code rate calculated according to above equation (1) less than a value of one.

In this regard, TBSs associated with all numbers of PRBs in the case of the TBS index "26A" may not be configured smaller than TBSs associated with the numbers of PRBs in the case of the TBS index "26", and only TBSs associated with part of the numbers of PRBs (e.g. "91" to "100") may be configured smaller than the TBSs associated with the number of PRBs in the case of the TBS index "26".

Further, when the PDSCH is transmitted by the specific transmission scheme, applying the new MCS table (e.g. FIG. 7B) or the correction table (e.g. FIG. 8) of the TBS table (e.g. FIG. 6) may be instructed by higher layer signaling.

When, for example, a PDSCH is transmitted by the specific transmission scheme, instruction information (e.g. altMod-TBS-Table) indicating applying the new MCS table (e.g. FIG. 7B) or the correction table (e.g. FIG. 8) of the TBS table (e.g. FIG. 6) may be included in the higher layer control information (e.g. PDSCH-Config) (see, for example, FIG. 15).

When the instruction information (e.g. altMod-TBS-Table) is included in the higher layer control information (e.g. PDSHC-Config), the user terminal may obtain the TBS index "26A" associated with the MCS index "28" from the new MCS table (e.g. FIG. 7B), and obtain a TBS associated with the TBS index "26A" and the number of PRBs allocated to the PDSCH from the correction table (e.g. FIG. 8).

Meanwhile, when the instruction information (e.g. altMod-TBS-Table) is not included in the higher layer control information (e.g. PDSHC-Config), the user terminal may obtain the TBS index "26" associated with the MCS index "28" from the existing MCS table (e.g. FIG. 7A), and may obtain a TBS associated with the TBS index "26" and the number of PRBs allocated to the PDSCH from the TBS table (e.g. FIG. 6).

According to Aspect 2, when the PDSCH is transmitted by the specific transmission scheme and the TBS index is a specific value (e.g. "26"), the user terminal obtains a TBS associated with the number of PRBs allocated to the PDSCH from the correction table. Consequently, even when the same modulation scheme (e.g. 64 QAM) is used for the specific transmission scheme, it is possible to make the code rate less than a value of one. As a result, the user terminal can appropriately receive and/or decode the downlink data.

(Aspect 3)

According to Aspect 3, a PDSCH is transmitted by a specific transmission scheme (at least one of, for example, that a transmission mode is the TM 9, that a transmission mode is the TM 9 or the TM 10, that the number of CSI-RS antenna ports is four or eight, that spatial multiplexing is performed on three layers or more, and that subframes are not MBSFN subframes), and, when a TBS index is a specific value (e.g. "26"), the user terminal obtains from the TBS table a TBS associated with a TBS index of the specific value and a value obtained by multiplying a predetermined coefficient on the number of PRBs.

Alternatively, according to Aspect 3, when the PDSCH is transmitted by the specific transmission scheme and when the TBS index is the specific value (e.g. "26") and the number of PRBs allocated to the PDSCH is the specific value ("100"), the user terminal may obtain from the TBS table a TBS associated with a TBS index of the specific value and a value obtained by multiplying a predetermined coefficient on the number of PRBs.

Alternatively, when the PDSCH is transmitted by the specific transmission scheme, the user terminal may obtain from the TBS table a TBS associated with a TBS index and a value obtained by multiplying a predetermined coefficient on the number of PRBs irrespective of a value of the TBS index and a value of the number of PRBs.

For example, the user terminal may calculate a value (i.e. the number of PRBs ($N_{RPB}$) for referring to the TBS table) obtained by multiplying a predetermined coefficient on the number of PRBs allocated to the PDSCH.

[Mathematical 2]

$$N_{PRB} = \max\{\lfloor N'_{PRB} \times 0.95 \rfloor, 1\} \quad \text{(Equation 2)}$$

When a predetermined coefficient (0.95 herein) is multiplied on the number of PRBs ($N'_{PRB}$) allocated to the PDSCH by using equation (2), a TBS determined based on the number of PRBs ($N_{PRB}$) becomes smaller than a TBS determined based on the number of PRBs ($N'_{PRB}$). Further, the predetermined coefficient may be notified by using a higher layer signal.

When, for example, the PDSCH is transmitted by a specific transmission scheme (e.g. a transmission mode is the TM 9 or the TM 10 and subframes are not MBSFN subframes), the predetermined coefficient (e.g. nPRB-Coeff) may be included in the higher layer control information (e.g. PDSCH-Config) (see, for example, FIG. 16).

When the predetermined coefficient (e.g. nPRB-Coeff) is included in the higher layer information (e.g. PDSCH-Config), and the TBS index is the specific value (e.g. "26"), the user terminal may obtain a TBS from the TBS table based on the number of PRBs multiplied with the predetermined coefficient.

According to Aspect 3, when the PDSCH is transmitted by the specific transmission scheme, a TBS is determined based on the number of PRBs ($N_{PRB}$) having a smaller value than the number of PRBs ($N'_{PRB}$). Consequently, even when the same modulation scheme (e.g. 64 QAM) is used for the specified transmission scheme, it is possible to make the code rate less than a value of one. As a result, the user terminal can appropriately receive and/or decode the downlink data.

(Radio Communication System)

A configuration of a radio communication system according to one or more embodiments of the present invention will be described below. The above radio communication method according to each of the aspects according to the present invention is applied to this radio communication system. In this regard, the radio communication method according to each of the above aspects may be applied alone or may be applied in combination.

Figure 9:
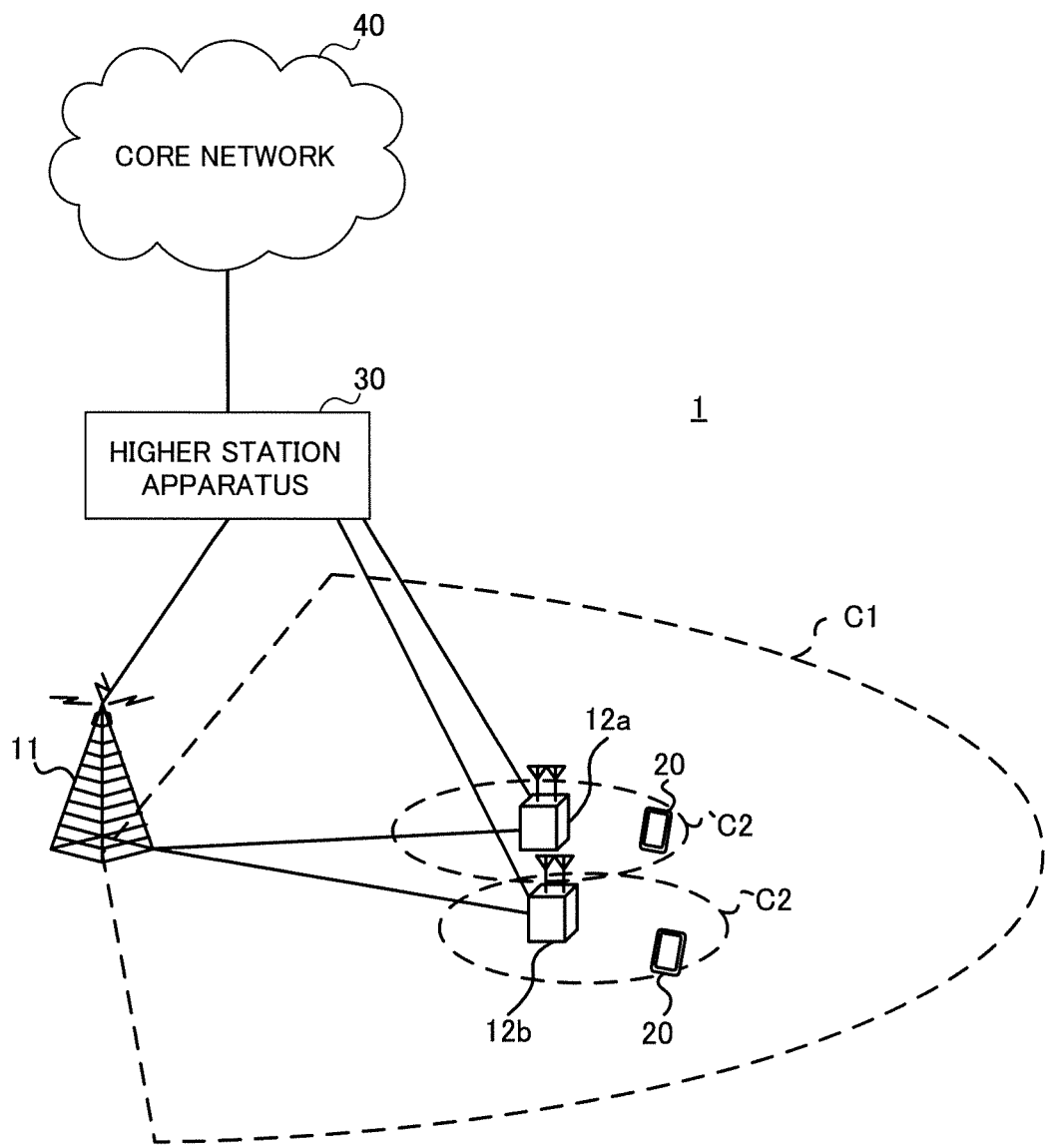
FIG. 9 is a schematic diagram illustrating an example of a radio communication system according to one or more embodiments of the present invention.

FIG. 9 is a diagram illustrating an example of a schematic configuration of the radio communication system according to one or more embodiments of the present invention. In a radio communication system 1, it is possible to apply Carrier Aggregation (CA) to aggregate a plurality of base frequency blocks (component carriers) whose one unit is a system bandwidth (e.g. 20 MHz) of an LTE system, and/or Dual Connectivity (DC). In this regard, the radio communication system 1 may be called SUPER 3G, LTE-A (LTE-Advanced), IMT-Advanced, 4G, 5G or FRA (Future Radio Access).

The radio communication system 1 illustrated in FIG. 9 includes a radio base station 11 that forms a macro cell C1, and radio base stations 12a to 12c that are located in the macro cell C1 and form small cells C2 narrower than the macro cell C1. Further, a user terminal 20 is located in the macro cell C1 and each small cell C2.

The user terminal 20 can connect to both of the radio base station 11 and the radio base stations 12. The user terminal 20 is assumed to concurrently use the macro cell C1 and the small cells C2 that use different frequencies according to CA or DC. Further, the user terminal 20 can apply CA or DC by using a plurality of cells (CCs) (e.g. six or more CCs).

The user terminal 20 and the radio base station 11 can communicate by using a carrier (an existing carrier that is called Legacy carrier) of a narrow bandwidth in a relatively low frequency band (e.g. 2 GHz). Meanwhile, the user terminal 20 and each radio base station 12 may use a carrier of a wide bandwidth in a relatively high frequency band (e.g. 3.5 GHz or 5 GHz) or may use the same carrier as that used by the radio base station 11. In this regard, configuration of a frequency band used by each radio base station is not limited to this.

The radio base station 11 and each radio base station 12 (or the two radio base stations 12) can be configured to be connected by wires (e.g. optical fibers compliant with a CPRI (Common Public Radio Interface) or an X2 interface) or by radio.

The radio base station 11 and each radio base station 12 are connected to a higher station apparatus 30 and are connected to a core network 40 via the higher station apparatus 30. In this regard, the higher station apparatus 30 includes, for example, an access gateway apparatus, a Radio Network Controller (RNC), a Mobility Management Entity (MME) and the like, but is not limited thereto. Further, each radio base station 12 may be connected to the higher station apparatus 30 via the radio base station 11.

In this regard, the radio base station 11 is a radio base station having relatively wide coverage, and may be referred to as a macro base station, an aggregate node, an eNB (eNodeB) and a transmission/reception point. Further, each radio base station 12 is a radio base station having local coverage, and may be referred to as a small base station, a micro base station, a pico base station, a femto base station, a HeNB (Home eNodeB), a RRH (Remote Radio Head) and a transmission/reception point. The radio base stations 11 and 12 will be collectively referred to as the radio base station 10 unless distinguished below.

Each user terminal 20 is a terminal that supports various communication schemes such as LTE and LTE-A, and may include not only a mobile communication terminal but also a fixed communication terminal.

The radio communication system 1 applies OFDMA (Orthogonal Frequency-Division Multiple Access) to downlink and SC-FDMA (Single Carrier-Frequency Division Multiple Access) to uplink as radio access schemes. OFDMA is a multicarrier transmission scheme of dividing a frequency band into a plurality of narrow frequency bands (subcarriers), mapping data on each subcarrier and performing communication. SC-FDMA is a single carrier transmission scheme of dividing a system bandwidth (CC) into a band configured by one or continuous resource blocks per terminal, using different bands for a plurality of terminals and reducing interference between terminals. In this regard, uplink and downlink radio access schemes are not limited to a combination of these and OFDMA may be applied to uplink.

The radio communication system 1 uses a downlink shared channel (PDSCH: Physical Downlink Shared Channel), a broadcast channel (PBCH: Physical Broadcast Channel) and a downlink L1/L2 control channel shared by each user terminal 20 as downlink channels. User data, higher layer control information and a SIB (System Information Block) are transmitted on the PDSCH. Further, a MIB (Master Information Block) is transmitted on the PBCH.

The downlink L1/L2 control channel includes a downlink control channel (PDCCH (Physical Downlink Control Channel), an EPDCCH (Enhanced Physical Downlink Control Channel), a PCFICH (Physical Control Format Indicator Channel), and a PHICH (Physical Hybrid-ARQ Indicator Channel)). Downlink Control Information (DCI) including scheduling information of the PDSCH and the PUSCH is transmitted on the PDCCH. The number of OFDM systems used for the PDCCH is transmitted on the PCFICH. Transmission acknowledgement information (ACK/NACK) of HARQ for the PUSCH is transmitted on the PHICH. The EPDCCH is subjected to frequency division multiplexing with the PDSCH (downlink shared data channel) and is used to transmit a DCI and the like similar to the PDCCH.

The radio communication system 1 uses an uplink shared channel (PUSCH: Physical Uplink Shared Channel), an uplink control channel (PUCCH: Physical Uplink Control Channel) and a random access channel (PRACH: Physical Random Access Channel) shared by each user terminal 20 as uplink channels. User data and higher layer control information are transmitted on the PUSCH. Uplink Control Information (UCI) including at least one of transmission acknowledgement information (ACK/NACK) and Radio Quality Information (CQI) is transmitted on the PUSCH or the PUCCH. A random access preamble for establishing connection with cells is transmitted on the PRACH.

<Radio Base Station>

Figure 10:
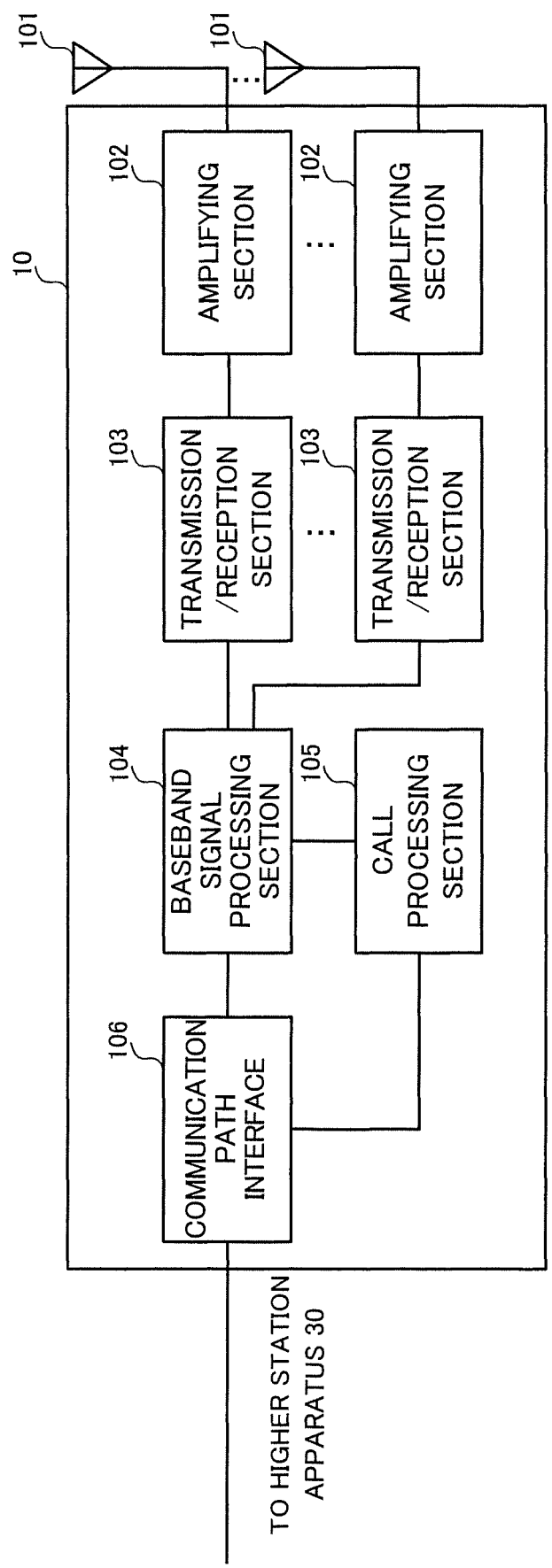
FIG. 10 is an explanatory diagram of an entire configuration of a radio base station according to one or more embodiments of the present invention.

FIG. 10 is a diagram illustrating an example of an entire configuration of the radio base station according to one or more embodiments of the present invention. The radio base station 10 includes a plurality of transmission/reception antennas 101, amplifying sections 102, transmission/reception sections 103, a baseband signal processing section 104, a call processing section 105, and a channel interface 106. In this regard, the radio base station 10 needs to be configured to include one or more transmission/reception antennas 101, amplifying sections 102 and transmission/reception sections 103.

User data transmitted from the radio base station 10 to the user terminal 20 on downlink is input from the higher station apparatus 30 to the baseband signal processing section 104 via the channel interface 106.

The baseband signal processing section 104 performs processing of a PDCP (Packet Data Convergence Protocol) layer, segmentation and concatenation of the user data, transmission processing of a RLC (Radio Link Control) layer such as RLC retransmission control, and MAC (Medium Access Control) retransmission control (such as transmission processing of HARQ (Hybrid Automatic Repeat reQuest)), and transmission processing such as scheduling, transmission format selection, channel coding, Inverse Fast Fourier Transform (IFFT) processing, and precoding processing on the user data to transfer to each transmission/reception section 103. Further, the baseband signal processing section 104 performs transmission processing such as channel coding and inverse fast Fourier transform on a downlink control signal, too, to transfer to each transmission/reception section 103.

Each transmission/reception section 103 converts a baseband signal precoded and output per antenna from each baseband signal processing section 104, into a signal of a radio frequency band to transmit. Each amplifying section 102 amplifies the radio frequency signal subjected to frequency conversion by each transmission/reception section 103, and transmits the radio frequency signal from each transmission/reception antenna 101.

The transmission/reception sections 103 can be composed of a transmitter/receiver, a transmission/reception circuit or a transmission/reception device described based on a common knowledge in a technical field of the present invention. In this regard, the transmission/reception sections 103 may be composed of an integrated transmission/reception section or may be composed of a transmission section and a reception section.

Meanwhile, each amplifying section 102 amplifies a radio frequency signal as an uplink signal received by each transmission/reception antenna 101. Each transmission/reception section 103 receives the uplink signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of a RLC layer and a PDCP layer on user data included in the input uplink signal to transfer to the higher station apparatus 30 via the channel interface 106. The call processing section 105 performs call processing such as configuration and release of a communication channel, state management of the radio base station 10, and management of radio resources.

The channel interface 106 transmits and receives signals to and from the higher station apparatus 30 via a predetermined interface. Further, the channel interface 106 may transmit and receive (backhaul signaling) signals to and from the neighboring radio base station 10 via an inter-base station interface (e.g. optical fibers compliant with the CPRI (Common Public Radio Interface) or the X2 interface).

Figure 11:
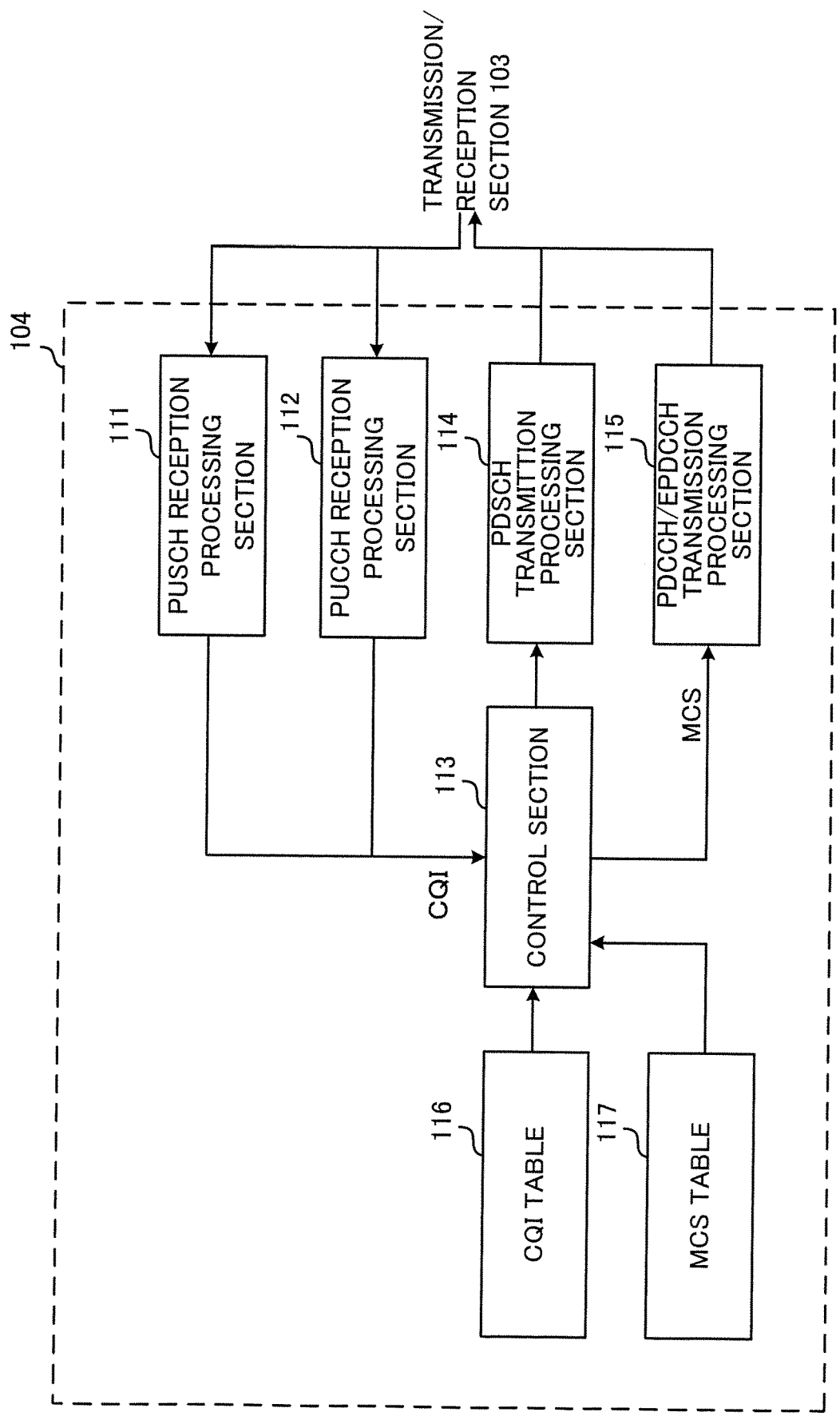
FIG. 11 is an explanatory diagram of a function configuration of the radio base station according to one or more embodiments of the present invention.

FIG. 11 is a function configuration diagram of the radio base station 10 according to one or more embodiments of the present invention. In this regard, the following function configuration is configured by the baseband signal processing section 104 of the radio base station 10. As illustrated in FIG. 11, the radio base station 10 includes a PUSCH reception processing section 111, a PUCCH reception processing section 112, a control section 113, a PDSCH transmission processing section 114, a PDCCH/EPDCCH transmission processing section 115, a CQI table 116, and a MCS table 117.

The PUSCH reception processing section 111 performs reception processing (e.g. demodulation and decoding) on user data and higher layer control information on the PUSCH. More specifically, the PUSCH reception processing section 111 obtains a Channel Quality Indicator (CQI) fed back from the user terminal 20 on the PUSCH.

The PUCCH reception processing section 112 performs reception processing (e.g. demodulation and decoding) on Uplink Control Information (UCI) on the PUCCH. More specifically, the PUCCH reception processing section 112 obtains the CQI fed back from the user terminal 20 on the PUCCH.

The PUSCH reception processing section 111 and the PUCCH reception processing section 112 can be composed of a signal processor, a signal processing circuit or a signal processing apparatus and a measurement instrument, a measurement circuit or a measurement apparatus described based on the common knowledge in the technical field according to the present invention.

The control section 113 determines a modulation scheme and a code rate applied to a downlink shared channel (PDSCH) based on the CQI obtained by the PUSCH reception processing section 111 or the PUCCH reception processing section 112. More specifically, the control section 113 obtains from the CQI table 116 the modulation scheme and the code rate associated with the CQI obtained by the PUSCH reception processing section 111 or the PUCCH reception processing section 112.

Further, the control section 113 determines a MCS index applied to the PDSCH. More specifically, the control section 113 obtains from the MCS table 117 a MCS index associated with the modulation scheme and the code rate obtained from the CQI table 116. In this regard, the MCS indicates at least one of a modulation order and a Transport Block Size (TBS) index associated with the modulation scheme and the code rate.

The control section 113 can be composed of a controller, a control circuit and a control apparatus described based on the common knowledge in the technical field according to the present invention.

The PDSCH transmission processing section 114 performs transmission processing (e.g. encoding and modulation) on user data and higher layer control information on the PDSCH. More specifically, the PDSCH transmission processing section 114 modulates and encodes the PDSCH by using the modulation scheme and the code rate determined by the control section 113. In this regard, when the PDSCH is transmitted by a specific transmission scheme (described below), higher layer control information may include instruction information indicating obtaining (applying) a TBS having a smaller value than a value of a TBS obtained from the TBS table.

More specifically, the higher layer control information (e.g. PDSCH-Config) may include the instruction information (e.g. altTBS) indicating obtaining (applying) a value separately configured from the values of the TBS table (e.g. FIG. 6) as a TBS associated with a TBS index of a specific value (e.g. "26") and the number of PRBs of a specific value (e.g. "100") (Aspect 1). Further, the higher layer control information (e.g. PDSCH-Config) may include the instruction information (e.g. altMOD-TBS-Table) indicating applying the new MCS table (e.g. FIG. 7B) and the correction table (e.g. FIG. 8) of the TBS table (e.g. FIG. 6) (Aspect 2). Furthermore, the higher layer control information (e.g. PDSCH-Config) may include a predetermined coefficient (nPRB-Coeff).

Still further, the PDSCH transmission processing section 114 may perform transmission processing of transmitting the PDSCH by the specific transmission scheme. In this regard, the specific transmission scheme includes at least one of, for example, that a transmission mode is the TM 9, that a transmission mode is the TM 9 or the TM 10, that the number of CSI-RS ports is four or eight, that spatial multiplexing is performed on three or more layers and that subframes are not MBSFN subframes. The user terminal 20 may be notified of information indicating the specific transmission scheme by higher layer signaling.

The PDCCH/EPDCCH transmission processing section 115 performs transmission processing (e.g. encoding and modulation) on Downlink Control Information (DCI) on the PDCCH/EPDCCH. More specifically, the PDCCH/EPDCCH transmission processing section 115 generates DCI including a MCS index determined by the control section 113 to transmit via each transmission/reception section 103.

The PDSCH transmission processing section 114 and the PDCCH/EPDCCH transmission processing section 115 can be composed of a signal generator, a signal generation circuit and a signal generating apparatus described based on the common knowledge in the technical field according to the present invention.

The CQI table 116 is a table that associates CQIs, modulation schemes and code rates. The MCS table 117 is a table that associates MCSs, modulation orders and TBS indices indicating Transport Block Sizes (TBSs). In this regard, the MCS table 117 may be the existing MCS table (FIGS. 3 and 7A) and may be the new MCS table (FIG. 7B) (Aspect 2).

<User Terminal>

Figure 12:
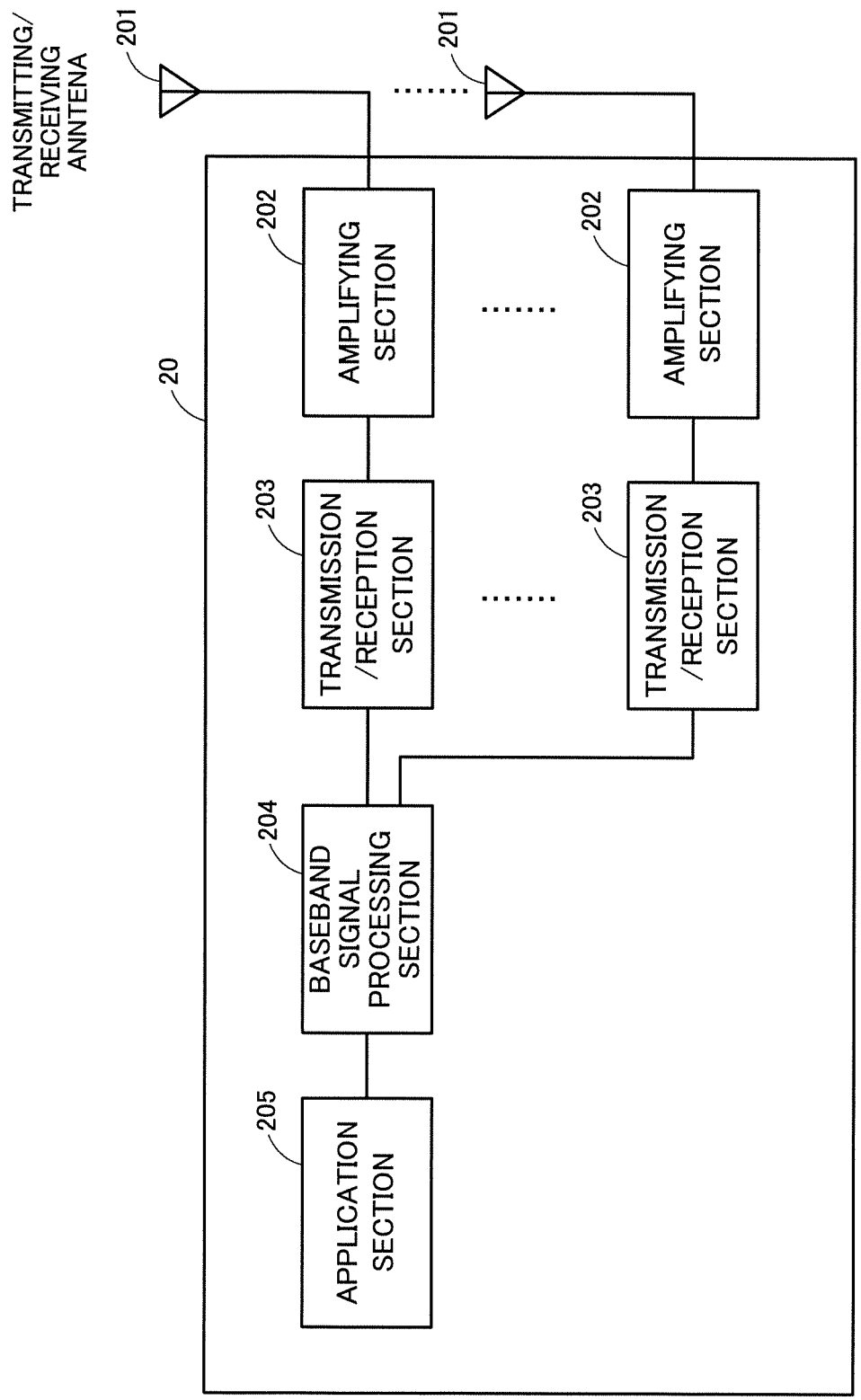
FIG. 12 is an explanatory diagram of an entire configuration of a user terminal according to one or more embodiments of the present invention.

FIG. 12 is a diagram illustrating an example of an entire configuration of the user terminal according to one or more embodiments of the present invention. The user terminal 20 includes a plurality of transmission/reception antennas 201 for MIMO transmission, amplifying sections 202, transmission/reception sections 203, a baseband signal processing section 204, and an application section 205.

The amplifying sections 202 amplify radio frequency signals received at a plurality of transmission/reception antennas 201. Each transmission/reception section 203 receives a downlink signal amplified by each amplifying section 202. Each transmission/reception section 203 performs frequency conversion on the received signal into a baseband signal, and outputs the baseband signal to the baseband signal processing section 204.

The baseband signal processing section 204 performs FFT processing, error correcting decoding, reception processing of retransmission control and the like on the input baseband signal. The baseband signal processing section 204 transfers downlink user data to the application section 205. The application section 205 performs processing concerning layers higher than a physical layer and a MAC layer. Further, the baseband signal processing section 204 transfers broadcast information among the downlink data, too, to the application section 205.

Meanwhile, the application section 205 inputs uplink user data to the baseband signal processing section 204. The baseband signal processing section 204 performs transmission processing of retransmission control (e.g. HARQ transmission processing), channel coding, precoding, Discrete Fourier Transform (DFT) processing, IFFT processing and the like on the uplink user data to transfer to each transmission/reception section 203. Each transmission/reception section 203 converts the baseband signal output from the baseband signal processing section 204 into a signal of a radio frequency band to transmit. Each amplifying section 202 amplifies the radio frequency signal subjected to the frequency conversion by each transmission/reception section 203 to transmit from each transmission/reception antenna 201.

The transmission/reception sections 203 can be composed of a transmitter/receiver, a transmission/reception circuit or a transmission/reception apparatus described based on the common knowledge in the technical field according to the present invention. Further, the transmission/reception sections 203 may be composed of an integrated transmission/reception section or may be composed of a transmission section and a reception section.

Figure 13:
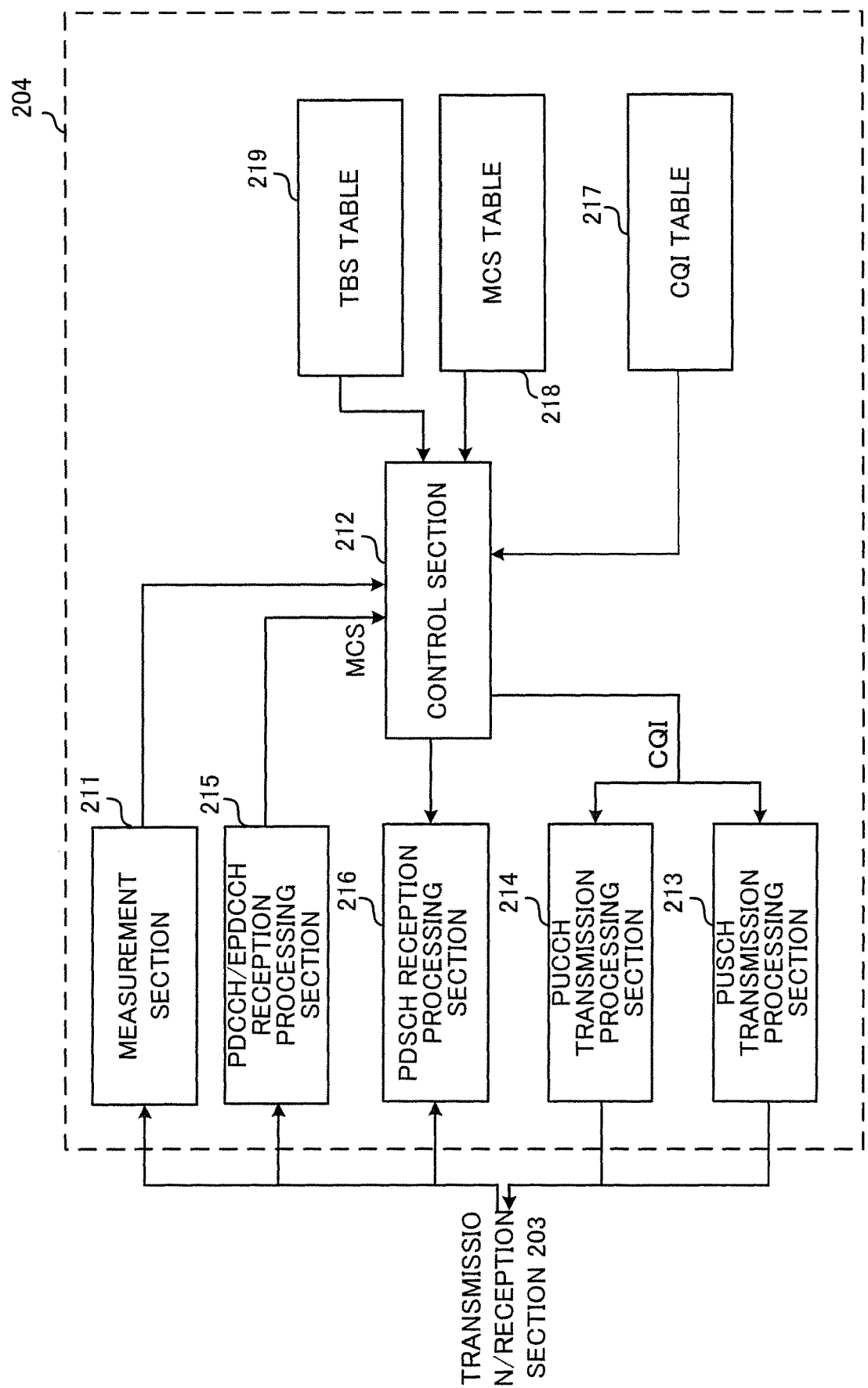
FIG. 13 is an explanatory diagram illustrating a function configuration of the user terminal according to one or more embodiments of the present invention.

FIG. 13 is a function configuration diagram of the user terminal 20 according to one or more embodiments of the present invention. In this regard, the following function configuration is composed by the baseband signal processing section 204 of the user terminal 20. As illustrated in FIG. 13, the user terminal 20 includes a measurement section 211, a control section 212, a PUSCH transmission processing section 213, a PUCCH transmission processing section 214, a PDCCH/EPDCCH reception processing section 215, a PDSCH reception processing section 216, a CQI table 217, a MCS table 218, and a TBS table 219.

The measurement section 211 measures channel quality of a reference signal from the radio base station 10. The channel quality may be, for example, a SNR or a SINR. The measurement section 211 can be composed of a signal processor, a signal processing circuit or a signal processing apparatus and a measurement instrument, a measurement circuit or a measurement apparatus described based on the common knowledge in the technical field according to the present invention.

The control section 212 obtains from the CQI table 217 a CQI indicating a modulation scheme and a code rate applicable to the PDSCH based on the channel quality measured by the measurement section 211. In this regard, the modulation scheme and the code rate applicable to the PDSCH refer to, for example, a modulation scheme and a code rate that satisfy a condition that a Block Error Rate (BLER) of the PDSCH is 10%.

The control section 212 obtains the modulation scheme and the code rate applicable to the PDSCH, based on the MCS index obtained by the PDCCH/EPDCCH reception processing section 215. More specifically, the control section 212 obtains from the MCS table 218 a modulation order and a TBS index associated with a MCS obtained by the PDCCH/EPDCCH reception processing section 215.

The control section 212 obtains a TBS associated with a TBS index associated with the MCS index obtained by the PDCCH/EPDCCH reception processing section 215 and the number of PRBs allocated to the PDSCH, from the TBS table 219 that associates TBS indices, the numbers of PRBs (resource blocks) and TBSs.

More specifically, the control section 212 obtains a TBS having a smaller value than a value of the TBS obtained from the TBS table 219 when the PDSCH is transmitted by the specific transmission scheme. As described above, the specific transmission scheme includes at least one of, for example, that a transmission mode is the TM 9, that spatial multiplexing is performed on three or more layers and that subframes are not MBSFN subframes.

When the PDSCH is transmitted by the specific transmission scheme and when the TBS index is a specific value (e.g. "26") and the number of PRBs allocated to the PDSCH is a specific value (e.g. "100"), the control section 212 may obtain a TBS having a value separately configured from the values of the TBS table that associates the TBS indices, the numbers of PRBs and the TBSs (Aspect 1).

When the PDSCH is transmitted by the specific transmission scheme and when the TBS index is a specific value (e.g. "26"), the control section 212 may obtain a TBS associated with the number of PRBs allocated to the PDSCH, from the correction table that associates the TBS index of a value (e.g. "34") defined in the TBS table, and a TBS associated with each number of PRBs (Aspect 2). In this regard, the TBS associated with each number of PRBs in the correction table may be configured smaller than the TBS of each number of PRBs in the TBS table 219.

When the PDSHC is transmitted by the specific transmission scheme and when the TBS index is a specific value (e.g. "26"), the control section 212 may obtain from the TBS table 219 a TBS associated with the TBS index of the specific value and a value obtained by multiplying a predetermined coefficient on the number of PRBs (Aspect 3). In this regard, a multiplication value of the predetermined coefficient multiplied on the number of PRBs is calculated according to, for example, above equation (2).

Alternatively, when the PDSCH is transmitted by the specific transmission scheme and when the TBS index is a specific value (e.g. "26") and the number of PRBs allocated to the PDSCH is a specific value (e.g. "100") the control section 212 may obtain from the TBS table 219 a TBS associated with the TBS index of the specific value and a value obtained by multiplying a predetermined coefficient on the number of PRBs (Aspect 3).

Alternatively, when the PDSCH is transmitted by the specific transmission scheme, the control section 212 may obtain from the TBS table 219 a TBS associated with a TBS index and a value obtained by multiplying a predetermined coefficient on the number of PRBs irrespective of the TBS indices and the numbers of PRBs allocated to the PDSCH.

Further, when the higher layer control information (e.g. PDSCH-Config) used for reception processing of the PDSCH includes instruction information, the control section 212 may obtain a TBS having a smaller value than a value of the TBS obtained from the TBS.

More specifically, when the higher layer control information (e.g. PDSCH-Config) includes instruction information (e.g. altTBS), and when the TBS index is a specific value (e.g. "26") and the number of PRBs allocated to the PDSCH is a specific value (e.g. "100"), the control section 212 may obtain (apply) a value separately configured from the values of the TBS table (Aspect 1). Meanwhile, when the higher layer control information (e.g. PDSCH-Config) does not include the instruction information (e.g. altTBS), the control section 212 may obtain a TBS from the TBS table.

Further, when the higher layer control information (e.g. PDSCH-Config) includes the instruction information (e.g. altMod-TBS-Table), the control section 212 may obtain a TBS index associated with a MCS index from the new MCS table (e.g. FIG. 7B), and obtain a TBS associated with a TBS index and the number of PRBs allocated to the PDSCH from the correction table (e.g. FIG. 8) (Aspect 2).

Furthermore, when the higher layer control information (e.g. PDSCH-Config) includes a predetermined coefficient (e.g. nPRB-Coeff), the control section 212 of the user terminal may obtain a TBS from the TBS table based on the number of PRBs multiplied with the predetermined coefficient (Aspect 3).

Meanwhile, when the higher layer control information (e.g. PDSCH-Config) does not include the instruction information (e.g. altMod-TBS-Table), the control section 212 may obtain a TBS index associated with a MCS index from the existing MCS table (e.g. FIG. 7A), and obtain a TBS associated with a TBS index and the number of PRBs allocated to the PDSCH from the MCS table (e.g. FIG. 6).

The PUSCH transmission processing section 213 performs transmission processing (e.g. encoding and modulation) on the user data and the higher layer control information on the PUSCH. More specifically, the PUSCH transmission processing section 213 transmits the CQI determined by the control section 212 via each transmission/reception section 203.

The PUCCH transmission processing section 214 performs transmission processing (e.g. encoding and modulation) of the Uplink Control Information (UCI) on the PUCCH. More specifically, the PUCCH transmission processing section 214 transmits the CQI determined by the control section 212 via each transmission/reception section 203.

The PUSCH transmission processing section 213 and the PUCCH transmission processing section 214 can be composed of a signal processor, a signal processing circuit or a signal processing apparatus described based on the common knowledge in the technical field according to the present invention.

The PDCCH/EPDCCH reception processing section 215 performs reception processing (e.g. blind decoding and demodulation) on the Downlink Control Information (DCI) on the PDCCH. More specifically, the PDCCH/EPDCCH reception processing section 215 obtains a MCS index included in DCI and the number of PRBs allocated to the PDSCH.

The PDSCH reception processing section 216 performs reception processing (e.g. demodulation and decoding) on the user data and the higher layer control information on the PDSCH. More specifically, the PDSCH reception processing section 216 modulates and encodes the PDSCH by using the modulation scheme and the TBS obtained by the control section 212. Further, the PDSCH reception processing section 216 may perform reception processing on the PDSCH transmitted by the specific transmission scheme.

The PDCCH/EPDCCH reception processing section 215 and the PDSCH reception processing section 216 can be composed of a signal processor, a signal processing circuit or a signal processing apparatus described based on the common knowledge in the technical field according to the present invention.

The CQI table 217 is the same as the above CQI table 116 and therefore will not be described. Further, the MCS table 218 is the same as the above MCS table 117 and therefore will not be described. The TBS table 219 is a table that associates TBS indices, and TBSs associated with the numbers of PRBs per transport block. The TBS table 219 may include the above correction table in Aspect 2.

In addition, the block diagrams used to describe embodiments illustrate blocks in function units. These function blocks (components) are realized by an arbitrary combination of hardware and software. Further, means for realizing each function block is not limited in particular. That is, each function block may be realized by one physically jointed apparatus or may be realized by a plurality of apparatuses formed by connecting two or more physically separate apparatuses by wires or by radio.

For example, part or all of the functions of the radio base station 10 and the user terminal 20 may be realized by using hardware such as an ASIC (Application Specific Integrated Circuit), a PLD (Programmable Logic Device) and a FPGA (Field Programmable Gate Array). Further, the radio base station 10 and the user terminal 20 may be realized by a computer apparatus including a processor (CPU: Central Processing Unit), a network connection communication interface, a memory, and a computer-readable storage medium that stores programs. That is, the radio base stations and the user terminal according to one or more embodiments of the present invention may function as a computer that performs processing of the radio communication method according to the present invention.

In this regard, the processor and the memory are connected by a bus that communicates information. Further, the computer-readable recording medium is, for example, a storage medium such as a flexible disk, a magnetooptical disk, a ROM (Read Only Memory), an EPROM (Erasable Programmable ROM), a CD-ROM (Compact Disc-ROM), a RAM (Random Access Memory) or a hard disk. Furthermore, the programs may be transmitted from a network via telecommunications lines. Still further, the radio base station 10 and the user terminal 20 may include an input apparatus such as an input key or an output apparatus such as a display.

Function configurations of the radio base station 10 and the user terminal 20 may be realized by the above-described hardware, may be realized by a software module executed by the processor or may be realized by a combination of both. The processor causes an operating system to operate and control the entire user terminal 20. Further, the processor reads programs, a software module or data from the storage medium out to the memory, and executes various types of processing according to the program, the software module or the data.

In this regard, the programs need to be programs that cause the computer to execute respective operations described in the above embodiments. For example, the control section 212 of the user terminal 20 may be realized by a control program stored in the memory and operated by the processor or other function blocks may be realized likewise, too.

Further, software and instructions may be transmitted and received via transmission media. When, for example, the software is transmitted from websites, servers or other remote sources by using wired techniques such as coaxial cables, optical fiber cables, twisted pairs and digital subscriber lines (DSL) and/or radio techniques such as infrared rays, radio waves and microwaves, these wired techniques and/or radio technique are included in a definition of the transmission media.

In this regard, each term that is described in this Description and/or is necessary to understand this Description may be replaced with terms having identical or similar meanings. For example, a channel and/or a symbol may be a signal (signaling). Further, a signal may be a message. Furthermore, a Component Carrier (CC) may be called a carrier frequency and a cell.

Still further, the pieces of information and parameters described in this Description may be expressed by absolute values, may be expressed by relative values of predetermined values or may be expressed by other pieces of corresponding information. For example, a radio resource may be indicated by an index.

The pieces of information and the signals described in this Description may be represented by using one of various different techniques. For example, the data, the instructions, the commands, the pieces of information, the signals, the bits, the symbols and the chips mentioned in the above description may be represented by voltages, currents, electromagnetic waves, magnetic fields or magnetic particles, optical fields, photons or arbitrary combinations thereof.

Each aspect/embodiment described in this Description may be used alone, may be used in combination or may be switched and used when carried out. Further, notification of predetermined information (e.g. notification of "being X") may be not only explicitly performed but also implicitly performed (e.g. this predetermined information is not notified).

Notification of information is not limited to the aspects/embodiments described in this Description and may be performed by other methods. For example, the notification of the information may be performed by physical layer signaling (e.g. DCI (Downlink Control Information) and UCI (Uplink Control Information)), higher layer signaling (e.g. RRC (Radio Resource Control) signaling, MAC (Medium Access Control) signaling, broadcast information (MIB (Master Information Block) and SIB (System Information Block))), other signals and combinations thereof. Further, the RRC signaling may be referred to as a RRC message and may be, for example, a RRC connection setup message or a RRC connection reconfiguration message.

Each aspect/embodiment described in this Description may be applied to LTE (Long Term Evolution), LTE-A (LTE-Advanced), SUPER 3G, IMT-Advanced, 4G, 5G, FRA (Future Radio Access), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), systems that use other appropriate systems and/or next-generation systems that are enhanced based on these systems.

Orders of the processing procedures, the sequences and the flowchart of each aspect/embodiment described in this Description may be rearranged unless contradictions arise. For example, the method described in this Description presents various step elements in an exemplary order and is not limited to the presented specific order.

As described above, the present invention is specifically described, but it is obvious to a person skilled in the art that the present invention is not limited to the embodiments described in the Description. The present invention is capable of being carried into practice as modified and changed aspects without departing from the subject matter and scope of the present invention defined by the description of the scope of the claims. Accordingly, the description of the Description is intended for illustrative explanation, and does not have any restrictive meaning to the present invention.

The invention claimed is:

1. A user terminal comprising:
a receiver that receives a downlink shared channel; and
a processor that obtains a transport block size (TBS) used for the downlink shared channel based on:
   a TBS index value that is associated with a modulation and coding scheme (MCS) index value used for the downlink shared channel; and
   a number of resource blocks (RBs) that are allocated to the downlink shared channel,
wherein, when the downlink shared channel is transmitted by a predetermined transmission scheme and the MCS index value is a predetermined value, the processor modifies the TBS index value associated with the predetermined value,
wherein the receiver receives, via RRC signaling, higher layer control information including instruction information instructing to apply the modified TBS index value,
wherein, based on the instruction information received via the RRC signaling, the processor obtains the TBS used for the downlink shared channel by applying the modified TBS index value and the number of RBs, and
wherein the predetermined value is 28 and the modified TBS index value is 26A.

2. The user terminal according to claim 1, wherein the processor obtains the TBS from a table that defines a TBS associated with each number of RBs in a case of the modified TBS index value.

3. The user terminal according to claim 2, wherein the TBS associated with at least one number of RBs in the modified TBS index value is smaller than the TBS associated with the one number of RBs in the TBS index value before being modified.

4. The user terminal according to claim 1, wherein the predetermined transmission scheme is either transmission mode 9 or transmission mode 10.

5. A radio base station comprising:
a transmitter that transmits a downlink shared channel; and
a processor that controls a transport block size (TBS) used for the downlink shared channel,
wherein the TBS is obtained in a user terminal based on:
   a TBS index value that is associated with a modulation and coding scheme (MCS) index value used for the downlink shared channel; and
   a number of resource blocks (RBs) that are allocated to the downlink shared channel,
wherein when the downlink shared channel is transmitted by a predetermined transmission scheme and the MCS index value is a predetermined value, the TBS index value associated with the predetermined value is modified,
wherein the transmitter transmits, via RRC signaling, higher layer control information including instruction information instructing to apply the modified TBS index value,
wherein, based on the instruction information transmitted via the RRC signaling, the user terminal obtains the TBS used for the downlink shared channel by applying the modified TBS index value and the number of RBs, and
wherein the predetermined value is 28 and the modified TBS index value is 26A.

6. A radio communication method for a user terminal, comprising:
receiving a downlink shared channel;
obtaining a transport block size (TBS) used for the downlink shared channel based on:
   a TBS index value that is associated with a modulation and coding scheme (MCS) index value used for the downlink shared channel; and
   a number of resource blocks (RB) that are allocated to the downlink shared channel,
   wherein, the obtaining further comprises, when the downlink shared channel is transmitted by a predetermined transmission scheme and the MCS index value is a predetermined value, modifying the TBS index value associated with the predetermined value;
receiving, via RRC signaling, higher layer control information including instruction information instructing to apply the modified TBS index value; and
based on the instruction information received via the RRC signaling, obtaining the TBS used for the downlink shared channel by applying the modified TBS index value and the number of RBs,
wherein the predetermined value is 28 and the modified TBS index value is 26A.

7. The user terminal according to claim 2, wherein the predetermined transmission scheme is either transmission mode 9 or transmission mode 10.

8. The user terminal according to claim 3, wherein the predetermined transmission scheme is either transmission mode 9 or transmission mode 10.

* * * * *